US009560282B2

(12) United States Patent
Brauer et al.

(10) Patent No.: US 9,560,282 B2
(45) Date of Patent: *Jan. 31, 2017

(54) SYSTEMS AND METHODS FOR CAPTURING IMAGES FROM A LOCK SCREEN

(71) Applicant: Google Inc., Mountain View, CA (US)

(72) Inventors: Robert Brauer, Munich (DE); Sebastian Amorim, Munich (DE)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/184,132

(22) Filed: Jun. 16, 2016

(65) Prior Publication Data

US 2016/0295124 A1    Oct. 6, 2016

Related U.S. Application Data

(63) Continuation of application No. 14/633,662, filed on Feb. 27, 2015, now Pat. No. 9,374,521.

(51) Int. Cl.
*H04N 5/222* (2006.01)
*H04N 5/232* (2006.01)
*H04M 1/02* (2006.01)
*H04M 1/673* (2006.01)

(52) U.S. Cl.
CPC ....... *H04N 5/23293* (2013.01); *H04M 1/0264* (2013.01); *H04M 1/673* (2013.01); *H04N 5/23216* (2013.01); *H04M 2250/12* (2013.01)

(58) Field of Classification Search
CPC ..................................................... H04N 5/232
See application file for complete search history.

(56) References Cited

U.S. PATENT DOCUMENTS

2015/0153946 A1    6/2015    Kim et al.
2015/0331574 A1    11/2015    Kim et al.

*Primary Examiner* — Gary C Vieaux
(74) *Attorney, Agent, or Firm* — Troutman Sanders LLP; James E. Schutz; Parker D. Hancock

(57) ABSTRACT

Techniques for entering an image-capture user interface from a locked mobile device and capturing an image while the mobile device is still in a locked state. In an example implementation, a mobile device at a lock-screen may detect a change in orientation of the mobile device from a portrait orientation to a landscape orientation. In response, the mobile device may display an image-capture UI. In some implementations, the image-capture UI may be overlaid over one or more elements of the lock-screen. Accordingly, the mobile device may provide visual notice to a user that the phone is still in a locked state while offering image capture functionality. In another implementation, the mobile device may provide another indication that the mobile device is still locked.

20 Claims, 6 Drawing Sheets

SYSTEMS AND METHODS FOR CAPTURING IMAGES FROM A LOCK SCREEN

CROSS-REFERENCE TO RELATED APPLICATIONS

This Application is a continuation application claiming priority under 35 U.S.C. §120 to U.S. patent application Ser. No. 14/633,662 entitled "Systems and Methods for Capturing Images from a Lock Screen," filed 27 Feb. 2015, the contents of which are incorporated by reference in their entirety as if fully set forth below.

BACKGROUND

Smartphones and other mobile computing devices are highly beneficial mobile companions. However, access to one of the most useful and popular features of smartphones—the ability to take pictures—is often buried deep within the smartphone's user interface (UI). This lack of accessibility significantly increases the time between a user realizing they want to take a picture and being able to realize that desire. Such delay may be the difference between capturing a moment and losing it forever. Accordingly, the utility of a smartphone and associated user experience may be significantly improved by streamlining the UI flow for activating a camera mode on smartphones.

SUMMARY

Some or all of the above needs may be addressed by certain implementations of the disclosed technology. Certain implementations include entering an image-capture mode of a mobile computing device while the mobile computing device is in a locked state and capturing an image while the mobile device is still in a locked state. For example, a mobile computing device at a lock-screen may detect a change in orientation of the mobile computing device from a portrait orientation to a landscape orientation. In response, the mobile computing device may display an image-capture UI. In some implementations, the image-capture UI may be overlaid over one or more elements of the lock-screen. Accordingly, the mobile computing device may provide visual notice to the user that the phone is still in a locked state while providing image capture functionality. Thus, implementations of the disclosed technology may improve the usability of camera-equipped mobile computing devices.

According to an example implementation, a method is provided. The method may include displaying, by a mobile device in a portrait orientation, a lock-screen user interface. The method may further include, while still displaying the lock-screen user interface, displaying a live image-capture preview overlaid over at least a portion of the lock-screen user interface such that one or more elements of the lock-screen user interface are still visible. The displaying of the live image-capture preview may be in response to determining that the mobile device has entered a landscape orientation. The method may yet further include receiving, at the mobile device, user input corresponding to a capture image command. In response to the user input, the mobile device may capture an image corresponding to the live image-capture preview.

According to an example implementation, another method is provided. The method may include displaying, by a mobile device in a portrait orientation, a lock-screen user interface. The method may further include, while still displaying the lock-screen user interface, displaying a live image-capture preview overlaid over at least a portion of the lock-screen user interface such that one or more elements of the lock-screen user interface are still visible. The displaying of the live image-capture preview may be in response to determining that the mobile device has entered a landscape orientation. The method may yet further include, responsive to a predetermined amount of time elapsing without receiving user input at the mobile device, stopping the displaying of the live image-capture preview.

According to another example implementation, a computer readable medium is provided. The computer readable medium may be embodied in a computer-program product, and may store instructions that, when executed by at least one processor in a system, cause the system to perform a method described above.

According to yet another example implementation, a mobile device is provided. The system may include a memory operatively coupled to a processor and configured for storing data and instructions that may be executed by the processor to perform a method described above.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
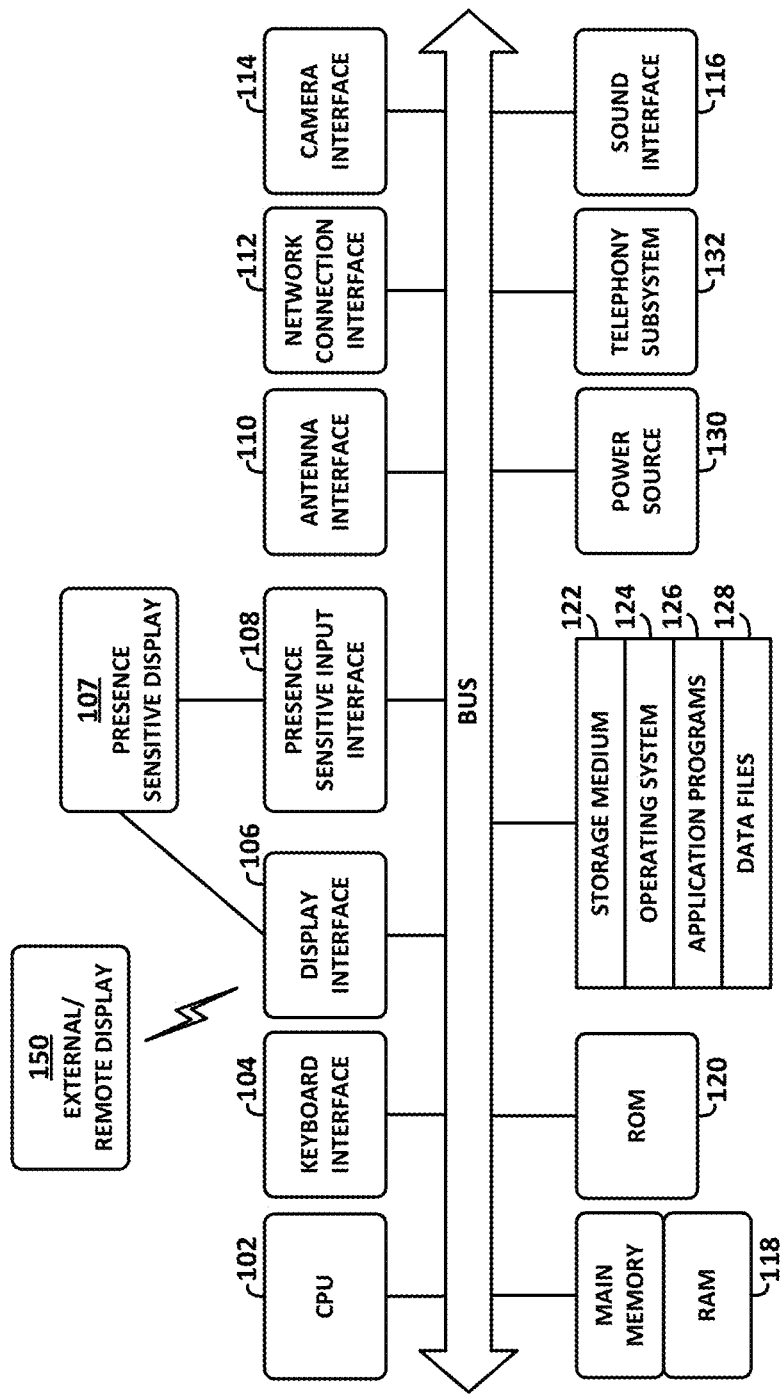
FIG. 1 depicts a block diagram of an illustrative computing device architecture 100, according to an example implementation.

Implementations of the disclosed technology include techniques for entering an image-capture mode of a mobile computing device while the mobile computing device is in a locked state and capturing an image while the mobile device is still in a locked state. In an example implementation, a mobile computing device at a lock-screen may detect a change in orientation of the mobile computing device from a portrait orientation to a landscape orientation. In response, the mobile computing device may display an image-capture UI. In some implementations, the image-capture UI may be overlaid over one or more elements of the lock-screen. Accordingly, the mobile computing device may provide visual notice to the user that the phone is still in a locked state while providing image capture functionality.

Throughout this disclosure, certain implementations are described by way of example in relation to activating an image-capture mode of a locked mobile device responsive to determining a change in orientation of the mobile device. However, implementations of the disclosed technology are not so limited, and may be include activating an image-capture mode of a mobile device responsive to various user inputs received at the mobile device or changes in mobile device state.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a personal digital assistant (PDA), satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, devices, methods, and computer-readable mediums may be utilized for entering an image-capture mode of a mobile computing device while the mobile computing device is in a locked state and capturing an image while the mobile device is still in a locked state, and will now be described with reference to the accompanying figures.

Figure 2:
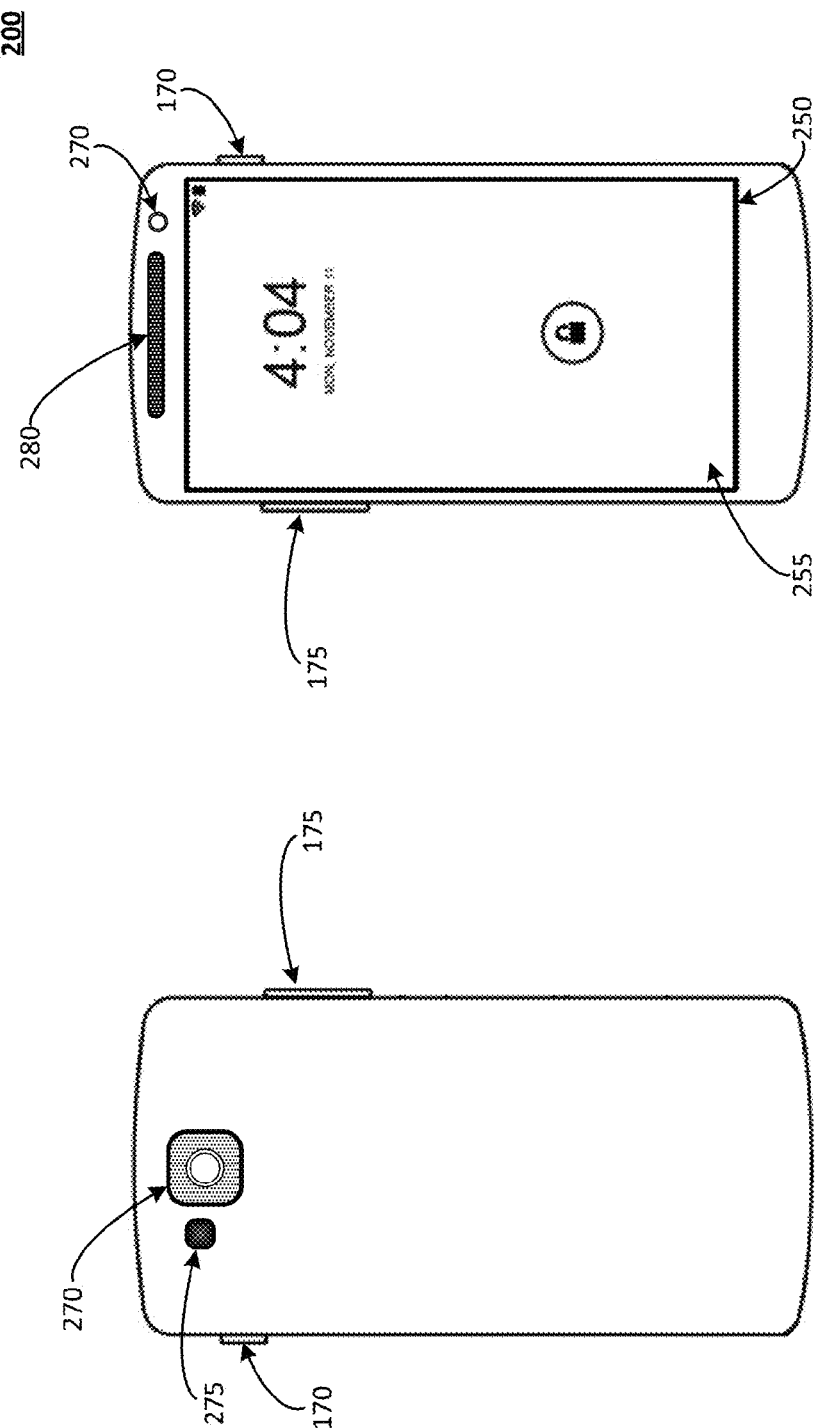
FIG. 2 depicts an illustration of a computing device 200, according to an example implementation.

FIG. 1 depicts a block diagram of an illustrative computing device architecture 100, according to an example implementation. Certain aspects of FIG. 1 may be embodied in a computing device 200 (for example, a mobile computing device as shown in FIG. 2). As desired, embodiments of the disclosed technology may include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 106 that acts as a communication interface and provides functions for rendering video, graphics, images, and texts on the display. According to certain some embodiments of the disclosed technology, the display interface 106 may be directly connected to a local display, such as a touch-screen display associated with a mobile computing device. In another example embodiment, the display interface 106 may be configured for providing data, images, and other information for an external/remote display that is not necessarily physically connected to the mobile computing device. For example, a desktop monitor may be utilized for mirroring graphics and other information that is presented on a mobile computing device. According to certain some embodiments, the display interface 106 may wirelessly communicate, for example, via a Wi-Fi channel or other available network connection interface 112 to the external/remote display.

In an example embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 104 that provides a communication interface to a keyboard. In one example embodiment, the computing device architecture 100 may include a presence-sensitive display interface 107 for connecting to a presence-sensitive display. According to certain some embodiments of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 104, the display interface 106, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. According to certain embodiments, a camera interface 114 is provided that acts as a communication interface and provides functions for capturing digital images from a camera. According to certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data may be stored in a volatile memory device for processing by the CPU 102.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the device 100 to transmit and receive sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, and/or in communication with one or more peripheral devices, such as display. In another example embodiment, the term computing device, as used herein, may refer to a mobile computing device 200, such as a smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device 200 may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

FIG. 2 depicts an illustration of a computing device 200, according to an example implementation. As shown in FIG. 2, the computing device may be a mobile computing device, for example, a smartphone or a tablet. The mobile computing device may have a built-in or integrated display for presenting a graphical user interface (GUI) 255 or other UI. The display may be combined with a presence sensitive input device to form a touch-sensitive or presence-sensitive display for receiving user input from a stylus, finger, or other means of gesture input. In some implementations, the mobile computing device may also include or be associated with a sound producing device 280, such as a speaker, piezoelectric buzzer, or the like.

According to certain implementations, the mobile computing device 200 may include one or more antennas or radios for wireless communication. These may include antennas for receiving GPS, Wi-Fi, or other radio communications. In addition, the mobile computing device may include one or more sensors for detecting, for example, orientation, acceleration, temperature, pressure, altitude, magnetic heading, etc.

According to certain implementations, the mobile computing device 200 may be in communication with an image capture device 270. As shown in FIG. 2, the computing device may include a built-in or internal image capture device, for example, a camera or CCD. Moreover, the computing device may have multiple image capture devices, for example, both forward-facing and rear cameras. The image capture device may include or be associated with an illumination device 275, for example, a flash device or IR beacon. In another example implementation, the image capture device may be external to the computing device and in communication with the computing device, for example, through a direct connection or wireless coupling.

According to certain implementations, the mobile computing device 200 may have one or more physical widgets 170 175. A physical widget may be or include a button, switch, toggle, etc. In some implementations, a physical widget may be depressible. For example, a button may physically contract when sufficient force is applied.

According to certain implementations, a mobile computing device 200 such as a smartphone or tablet may be in a locked state wherein access to certain mobile device functionality is restricted. When the display of such a locked mobile computing device is powered on, the mobile computing device may present a lock-screen 375. A lock-screen may be a UI or portion thereof that regulates immediate access to a mobile computing device. To navigate past a lock-screen and gain access to the restricted functionality, a user may be required to confirm their intention to use the mobile computing device by entering a gesture through the device's presence-sensitive display or other sensors. The user may also be required to authenticate themselves by entering a password, key combination, or other unique gesture.

Figure 3:
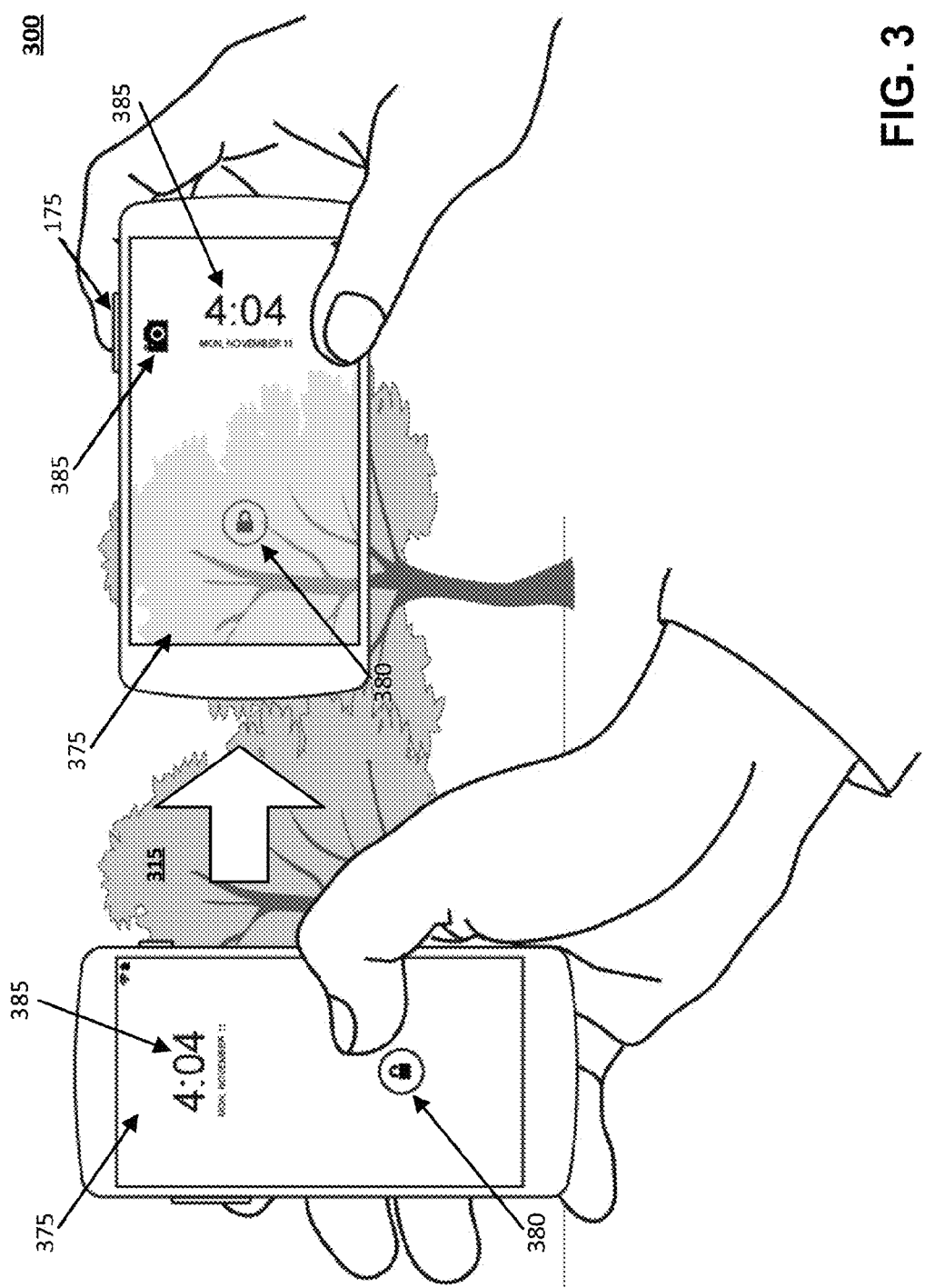
FIG. 3 depicts an illustration of activation 300 of an image-capture mode from a lock-screen of a mobile computing device 200, according to an example implementation.

In some implementations, a lock-screen may present one or more UI elements alerting the user that the mobile computing device is in a locked state. As shown in FIG. 3, an icon 380 or other indication may provide notice to a user that the phone is in a locked state. Other icons may provide an indication of other states of the mobile computing device, for example, network connectivity, remaining battery life, or a time and date 385 associated with the mobile computing device.

With conventional mobile device technology, it can take several steps before a user at a lock-screen of a mobile computing device 200 is able to access image-capture functionality of the mobile computing device. For example, a user may be burdened with first unlocking the mobile computing device, enduring an unwieldy and error-prone user authentication process, and then navigating through a series to menus before finally launching a camera application—all when time is of the essence for capturing a fleeting scene.

As described herein, certain implementations of the disclosed technology include entering an image-capture mode of a mobile computing device while the mobile computing device is in a locked state and capturing an image while the mobile device is still in a locked state. For example, some implementations may reduce the amount of steps required to take a picture to two button presses: one in portrait mode, one in landscape mode. Accordingly, the usability of mobile computing devices may be improved over conventional approaches and the likelihood increased of a user successfully capturing a moment which can be stored and shared with others.

FIG. 3 depicts an illustration of activation 300 of an image-capture mode from a lock-screen of a mobile computing device 200, according to an example implementation. According to certain implementations, the mobile computing device may enter the image-capture mode based on a detected change in state of the mobile computing device. For example, as shown in FIG. 3, a mobile computing device in a portrait orientation may be rotated to a landscape orientation. The mobile computing device may detect this rotation or change in orientation, and, in response, enter an image-capture mode. In some implementations, the mobile computing device may detect the change in orientation using one or more sensors, e.g., accelerometer, gyroscopes, magnetometers, etc. Other suitable hardware for determining a change in orientation will be apparent to one of skill in the art.

Although every tilt of a mobile computing device 200 may not accurately reflect user intent to enter an image-capture mode, rotating a smartphone to take a picture in landscape orientation may be an efficient and intuitive mechanism considering lock-screens of smartphones are presented almost exclusively in portrait mode. Moreover, a user will often wish to rotate a smartphone to a landscape orientation to capture a wider horizontal angle of a scene.

In some implementations, the mobile computing device 200 may consider additional or alternative factors in determining whether a change in orientation should result in entering the image-capture mode. For example, the mobile computing device may consider transition time between orientations; direction, speed, and smoothness of rotation; hysteresis, etc. Moreover, in some implementations, a mobile computing device may be "trained" or automatically learn when a particular user of the mobile computing device intends to trigger the image-capture mode. In another implementation, a user may able to manually fine tune settings associated with the mobile computing device to improve detection. Accordingly, various implementations may include technology to reduce false positives and otherwise improve the accuracy of detection.

Figure 4:
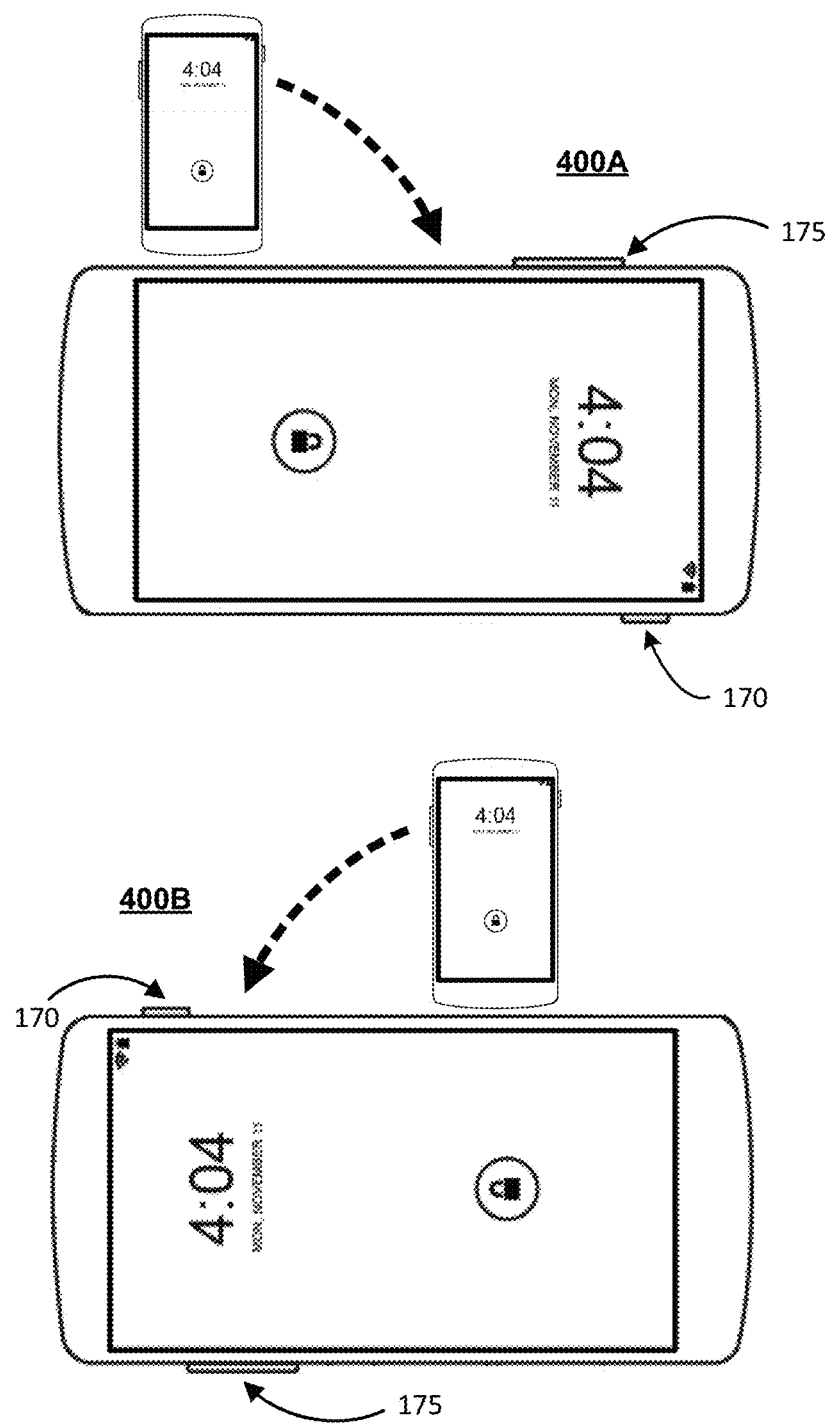
FIG. 4 depicts illustrations 400A and 400B of different rotations and orientations of a mobile computing device 200, according to an example implementation.

FIG. 4 depicts illustrations 400A and 400B of different rotations and orientations of a mobile computing device 200, according to an example implementation. According to certain implementations, an image-capture mode may be activated with different parameters based on various qualities of a detected motion or change in orientation of the mobile computing device. For example, 400A and 400B show a mobile computing device rotated in opposite directions to achieve different portrait orientations. In some implementations, each rotation, or resulting portrait orientation, may be associated with different configuraitons of the image-capture mode. For example, as described below, entering an entering an image-capture mode may include displaying an image-capture UI including a live image-capture preview. Rotating to a first portrait orientation may result in entering the image-capture mode with a live image-capture preview based on a front-facing camera of the smartphone. Rotating another direction to a second portrait orientation may result in entering the image-capture mode with a live image-capture preview based on a rear camera of the smartphone.

According to certain implementations, entering an image-capture mode may include displaying an image-capture UI. In some implementations, the image-capture UI may include a live preview corresponding to the current view of an image-capture device 270 of the mobile computing device. Accordingly, the live image-capture preview may provide the user with an indication of what a photo may look like if captured by a smartphone's camera at that point in time. For example, as shown in FIG. 3, the scenery behind the mobile computing device 200, as viewed by a rear image-capture device 270, is reflected on the live image-capture preview on the display 250 of the mobile computing device.

The image-capture UI may also include other UI elements or features. For example, as shown in FIG. 3, one or more software camera controls may be provided. Camera icon 385 may be used to trigger the capture of an image responsive to user input received at the icon.

According to certain implementations, the live image-capture preview may be superimposed or overlaid with elements of the lock-screen UI. For example, as shown in FIG. 3, the indication of the time 385, and other lock-screen UI elements 380 are still visible even though the live image-capture preview is being displayed. Accordingly, the mobile computing device 200 may provide notice to a user that the mobile computing device is still in a locked state.

Various approaches may be utilized to ensure the lock-screen UI and live image-capture preview are distinctly visible. In some implementations, the live image-capture preview may be darkened. In another implementation, a shadow or outline may be provided around lock-screen or other UI elements to distinguish them from the live image-capture preview.

According to certain implementations, the lock-screen UI elements may be hidden after initial display with the live image-capture preview. In some implementations, the lock-screen UI elements may be hidden after a predetermined amount of time elapsed since entering the image-capture mode, or since user input was received. In another implementation, the lock-screen UI elements may be hidden responsive to receiving a particular user input.

According to certain implementations, indications for only a limited subset of available image-capture functionality may be displayed after entering the image-capture mode from a lock-screen of the mobile computing device 200. For example, an image-capture UI may not initially include icons or other widgets for accessing zoom or flash controls. In some implementations, however, controls for a set of expanded set of image-capture functionality may be displayed in response to receiving a particular user input while in the image-capture mode. In an example implementation, unlocking or authentication may be required to access the expanded features.

According to certain implementations, an image may be captured while in the image-capture mode, responsive to receiving a particular user input. In some implementations, user input corresponding to a capture image command may be received at a software widget or other UI element, for example icon 385, as shown in FIG. 3. In another implementation, user input corresponding to the capture image command may be received at a physical widget 175 of the mobile computing device. The use of physical widgets to trigger image capture may help prevent false positives, as significant normal force may need to be applied across a small surface, for example, to depress a physical button.

In some implementations, physical buttons and other widgets associated with a primary or default command or function may be associated with other commands while in image-capture mode. For example, a volume control rocker may be used to trigger the capture of an image while the image-capture mode is activated, as shown in FIG. 3. In an example implementation, a button for ending the image-capture mode or powering down the display 255 may be physically located on an opposite side of the mobile computing device from a button for trigger the capture of an image (see e.g., 175A and 175B in FIG. 4).

In some implementations, physical widgets may also be assigned different functions based on the orientation (and thus their positions respective to the user) of the mobile computing device. For example, in the first orientation of 400A, volume rocker 175A on top of the mobile computing device may be used to trigger capture of an image, and the power button 175B on the bottom of the computing device may cause the image-capture mode to end or the display 255 to power down when depressed; in the second orientation of 400B, the volume rocker, now on bottom, may cause the image-capture mode to end or the display to power down when depressed and the power button may cause the capture of an image.

According to certain implementations, to further the prevention of false positives (e.g., taking photos or activating the camera streams by accident) the display of the mobile computing device may be required to be powered on or activated before an image-capture mode maybe activated. In another implementation, the display of the mobile computing device must be powered on or activated responsive to user input, rather than an internal device event, such as a new message or low battery notification.

Figure 5:
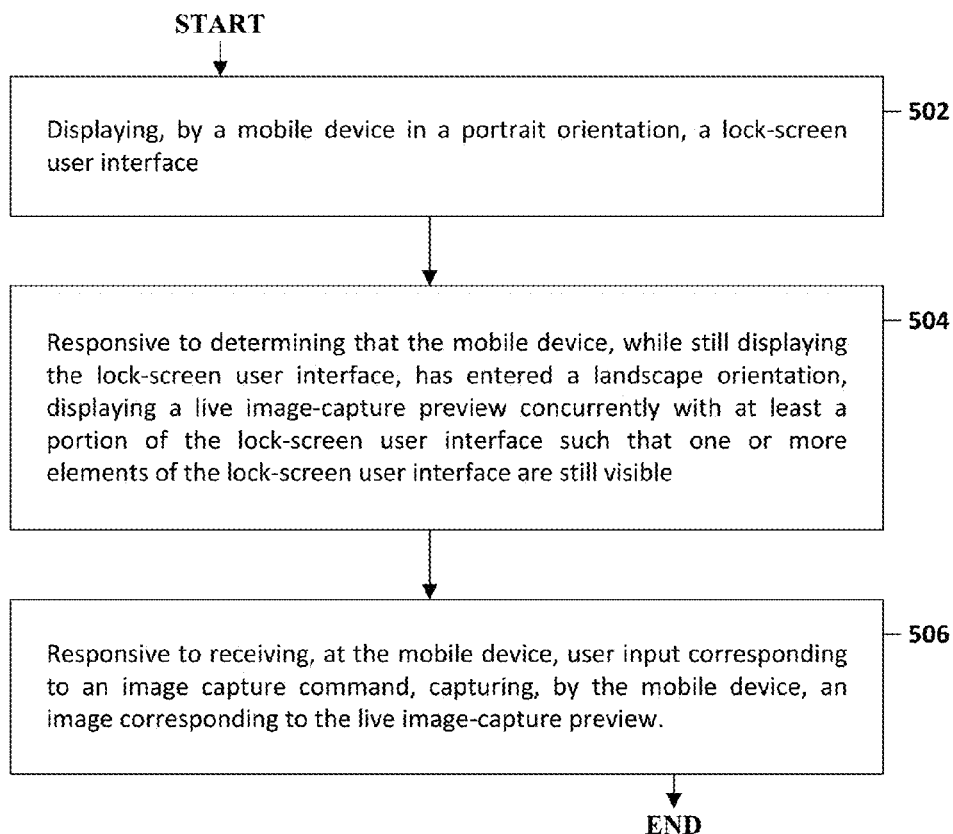
FIG. 5 is a flow diagram of a method 400 for activating an image-capture mode from a lock-screen of a mobile computing device 200, according to an example implementation.

FIG. 5 is a flow diagram of a method 400 for activating an image-capture mode from a lock-screen of a mobile computing device 200, according to an example implementation. As shown in FIG. 5, the method 500 starts in block 502, and, according to an example implementation, includes displaying, by a mobile device in a portrait orientation, a lock-screen user interface. In block 504, the method 500 includes responsive to determining that the mobile device, while still displaying the lock-screen user interface, has entered a landscape orientation, displaying a live image-capture preview overlaid over at least a portion of the lock-screen user interface such that one or more elements of the lock-screen user interface are still visible. In block 506, the method 500 includes responsive to receiving, at the mobile device, user input corresponding to a capture image command, capturing, by the mobile device, an image corresponding to the live image-capture preview.

Figure 6:
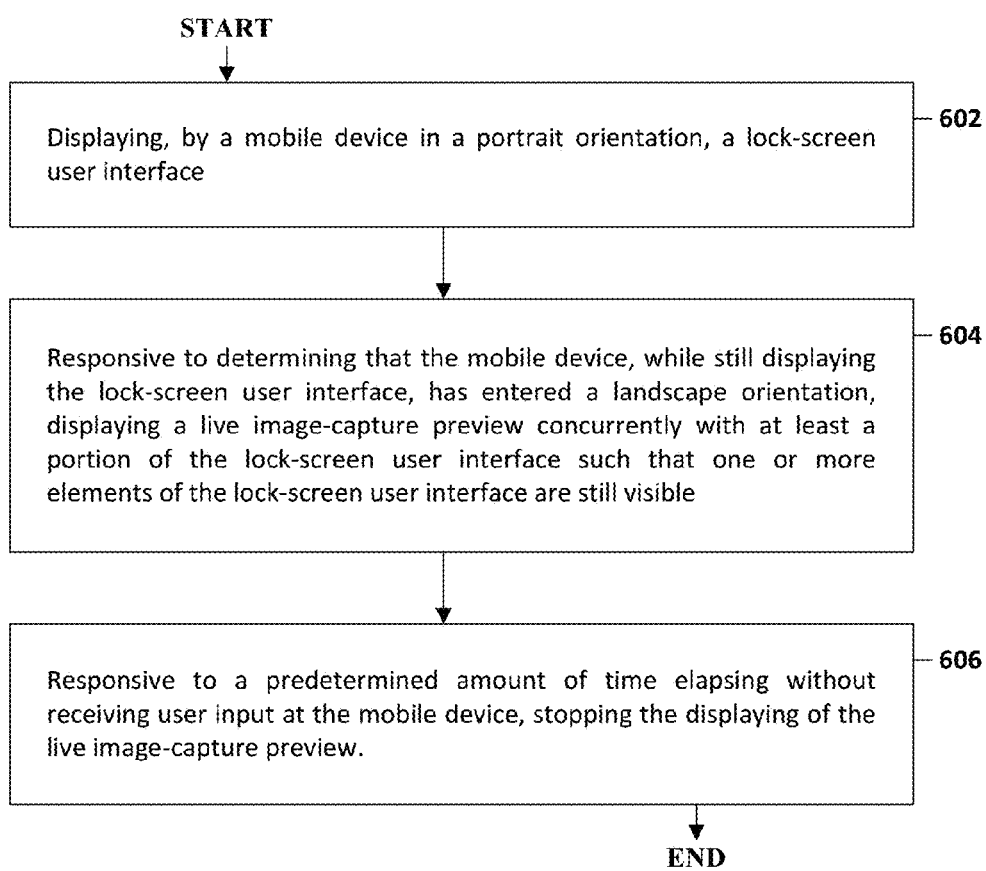
FIG. 6 is a flow diagram of another method 500 for activating an image-capture mode from a lock-screen of a mobile computing device 200, according to an example implementation.

FIG. 6 is a flow diagram of another method 500 for activating an image-capture mode from a lock-screen of a mobile computing device 200, according to an example implementation. As shown in FIG. 6, the method 600 starts in block 602, and, according to an example implementation, includes displaying, by the mobile device in a portrait orientation, a lock-screen user interface. In block 604, the method 600 includes responsive to determining that the mobile device, while still displaying the lock-screen user interface, has entered a landscape orientation, displaying a live image-capture preview overlaid over at least a portion of the lock-screen user interface such that one or more elements of the lock-screen user interface are still visible. In block 606, the method 600 includes responsive to a predetermined amount of time elapsing without receiving user input at the mobile device, stopping the displaying of the live image-capture preview.

It will be understood that the various steps shown in FIGS. 4 and 5 are illustrative only, and that steps may be removed, other steps may be used, or the order of steps may be modified.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:
1. A method comprising:
   displaying, by a mobile device in a portrait orientation, a lock-screen user interface;

responsive to determining, while still displaying the lock-screen user interface, that the mobile device has entered a landscape orientation, displaying a live image-capture preview; and responsive to receiving user input corresponding to a capture image command, capturing an image corresponding to the live image-capture preview.

2. The method of claim 1, further comprising, responsive to determining that the mobile device has re-entered a portrait orientation, maintaining the display of the live image-capture preview.

3. The method of claim 1, wherein the user input corresponding to capture image command is received at a physical widget of the mobile device.

4. The method of claim 3, wherein the physical widget is configured to effect a change in volume control while the live image-capture preview is not being displayed.

5. The method of claim 1, further comprising displaying a virtual widget, wherein the user input corresponding to capture image command is received at the virtual widget.

6. The method of claim 1, wherein the user input corresponding to the capture image command is a second user input, the method further comprising displaying one or more camera user interface controls responsive receiving a first user input.

7. The method of claim 1, wherein the user input corresponding to the capture image command is a second user input, the method further comprising hiding one or more elements of the lock-screen user interface, responsive to receiving a first user input.

8. The method of claim 7, wherein the mobile device remains in a locked state after hiding the one more elements of the lock-screen user interface.

9. The method of claim 1, further comprising a physical button for controlling a volume of the mobile device, wherein the user input corresponding to the capture image command is received at the physical button.

10. A mobile device comprising:
at least one processor;
at least one memory operatively coupled to the at least one processor and configured for storing data and instructions that, when executed by the processor, cause the mobile device to perform a method comprising:
displaying, by the mobile device in a portrait orientation, a lock-screen user interface;
responsive to determining, while still displaying the lock-screen user interface, that the mobile device has entered a landscape orientation, displaying a live image- capture preview; and
responsive to receiving user input corresponding to a capture image command, capturing an image corresponding to the live image-capture preview.

11. The mobile device of claim 10, further comprising a first front image-capture device and a second rear image-capture device, the method further comprising determining a direction of rotation associated with the mobile device entering the landscape orientation, and wherein the live image-capture preview corresponds to the front image-capture device based on a first direction of rotation and the live image-capture preview corresponds to the rear image-capture device based on a second direction of rotation.

12. The mobile device of claim 10, further comprising a physical widget, wherein the user input corresponding to the capture image command is received at the physical widget.

13. The mobile device of claim 12, wherein the physical widget is depressible.

14. The mobile device of claim 12, wherein the physical widget is depressible is a first physical widget and positioned on the mobile device on a side opposite a second physical widget of the mobile device, the second physical widget being a power button.

15. The mobile device of claim 12, wherein the physical widget is configured to effect a change in volume control while the phone is unlocked.

16. The mobile device of claim 10, further comprising, responsive to determining that the mobile device has re-entered a portrait orientation, maintaining the display of the live image-capture preview.

17. A computer-program product embodied in a non-transitory computer-readable storage medium having instructions encoded thereon that, when executed by a mobile device, causes the mobile device to perform a method comprising:
displaying, by the mobile device in a portrait orientation, a lock-screen user interface;
responsive to determining, while still displaying the lock-screen user interface, that the mobile device has entered a landscape orientation, displaying a live image-capture preview; and
responsive to user input corresponding to a capture image command, capturing an image corresponding to the live image-capture preview.

18. The computer-program product of claim 17, the method further comprising powering down a display device of the mobile device, responsive to a predetermined amount of time elapsing.

19. The computer-program product of claim 17, wherein the mobile device displays an indication of a current time of day when displaying a live image-capture preview.

20. The computer-program product of claim 17, further comprising, responsive to determining that the mobile device has re-entered a portrait orientation, maintaining the display of the live image-capture preview.

* * * * *